(12) United States Patent
Harada et al.

(10) Patent No.: US 12,291,607 B2
(45) Date of Patent: May 6, 2025

(54) POLYMER MATERIAL AND METHOD FOR PRODUCING SAME

(71) Applicants: Osaka University, Suita (JP); Yushiro Chemical Industry Co., Ltd., Tokyo (JP)

(72) Inventors: Akira Harada, Suita (JP); Hiroyasu Yamaguchi, Suita (JP); Yoshinori Takashima, Suita (JP); Motofumi Osaki, Suita (JP); Yasumasa Ohashi, Koza-gun (JP); Hiroaki Takahashi, Koza-gun (JP); Hidenori Shirakawa, Koza-gun (JP)

(73) Assignees: OSAKA UNIVERSITY, Osaka (JP); YUSHIRO CHEMICAL INDUSTRY CO., LTD., Tokyo (JP)

( * ) Notice: Subject to any disclaimer, the term of this patent is extended or adjusted under 35 U.S.C. 154(b) by 745 days.

(21) Appl. No.: 17/434,600

(22) PCT Filed: Mar. 6, 2020

(86) PCT No.: PCT/JP2020/009666
§ 371 (c)(1),
(2) Date: Aug. 27, 2021

(87) PCT Pub. No.: WO2020/179908
PCT Pub. Date: Sep. 10, 2020

(65) Prior Publication Data
US 2022/0153934 A1 May 19, 2022

(30) Foreign Application Priority Data

Mar. 6, 2019 (JP) ................................ 2019-040853

(51) Int. Cl.
*C08G 83/00* (2006.01)
*C08B 37/12* (2006.01)
(Continued)

(52) U.S. Cl.
CPC ........ *C08G 83/008* (2013.01); *C08B 37/0012* (2013.01); *C08B 37/0015* (2013.01);
(Continued)

(58) Field of Classification Search
CPC ... C08B 37/0012; C08B 37/0015; C08L 5/16; C08F 220/58; C08F 216/10
See application file for complete search history.

(56) References Cited

U.S. PATENT DOCUMENTS 10,174,172 B2  1/2019 Harada et al.
2013/0172479 A1*  7/2013 Harada ................ C08F 220/56
                                                526/238.22
(Continued)

FOREIGN PATENT DOCUMENTS

EP  3590972 A1  1/2020
JP  2018-016704 A  2/2018
(Continued)

OTHER PUBLICATIONS

S. Ikura et al., "Preparation of supramolecular material by solvent-free polymerization using cyclodextrin monomer, evaluation of its dynamics, proceedings of the Society of Polymer Science," Polymer Preprints, Japan, 67th 2018, vol. 67, No. 2, 1M10 and partial translation thereof. (cited in the Jul. 23, 2020 Office Action issued for the corresponding JP2019-040853.).

(Continued)

*Primary Examiner* — Kregg T Brooks
*Assistant Examiner* — David R. Foss
(74) *Attorney, Agent, or Firm* — Troutman Pepper Locke LLP; James E. Armstrong, IV; Nicholas J. DiCeglie, Jr.

(57) ABSTRACT

Provided is a macromolecular material that has self-healing properties, excellent stretchability, and a high degree of freedom in the design of stretchability, strength, and hardness, and that can be produced by a simple method; and also (Continued)

provided is a method for producing the same. The macromolecular material of the present invention comprises a polymer having a host group and a guest group. The host group is a monovalent group formed by removing one hydrogen atom or hydroxy group from a cyclodextrin derivative. The polymer is a polymer of a monomer mixture containing a host group-containing polymerizable monomer, a guest group-containing polymerizable monomer, and a third polymerizable monomer, and the third polymerizable monomer contains a (meth)acrylic ester compound. The host group-containing polymerizable monomer and the guest group-containing polymerizable monomer have a property of being dissolved in the third polymerizable monomer.

6 Claims, 1 Drawing Sheet

(51) Int. Cl.
| | |
|---|---|
| *C08B 37/16* | (2006.01) |
| *C08F 216/00* | (2006.01) |
| *C08F 216/10* | (2006.01) |
| *C08F 220/54* | (2006.01) |
| *C08F 220/58* | (2006.01) |
| *C08L 5/00* | (2006.01) |
| *C08L 5/16* | (2006.01) |

(52) U.S. Cl.
CPC ............ *C08B 37/12* (2013.01); *C08F 216/00* (2013.01); *C08F 216/10* (2013.01); *C08F 220/54* (2013.01); *C08F 220/58* (2013.01); *C08L 5/00* (2013.01); *C08L 5/16* (2013.01)

(56) References Cited

U.S. PATENT DOCUMENTS

| | | |
|---|---|---|
| 2016/0272768 A1 | 9/2016 | Harada et al. |
| 2019/0177455 A1 | 6/2019 | Harada et al. |
| 2021/0155731 A1 | 5/2021 | Harada et al. |

FOREIGN PATENT DOCUMENTS

| | | |
|---|---|---|
| WO | 2015/030079 A1 | 3/2015 |
| WO | 2018/038186 A1 | 3/2018 |
| WO | 2018/159791 A1 | 9/2018 |
| WO | 2018/207934 A1 | 11/2018 |

OTHER PUBLICATIONS

Office Action dated Jul. 23, 2019 for the correspondingJP patent application No. 2019-040853.

* cited by examiner

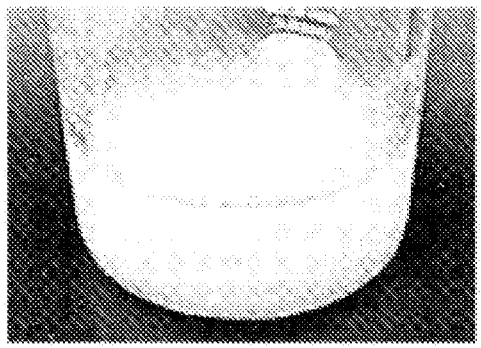
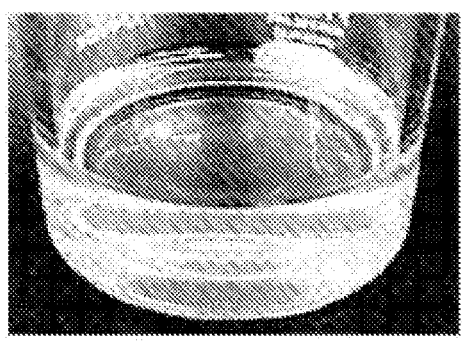

POLYMER MATERIAL AND METHOD FOR PRODUCING SAME

TECHNICAL FIELD

Supramolecular materials that are highly functionalized in various aspects have been actively developed by sophisticatedly using non-covalent-bond interaction, such as host-guest interaction. For example, PTL 1 discloses a self-repairing material that uses the reversibility of host-guest interaction. Even if the entire material is cut, this self-repairing material can be recovered to the original material strength by bringing the cut surfaces into contact with each other again, and is highly anticipated as a novel functional macromolecular material.

CITATION LIST

Patent Literature

PTL 1: WO2015/030079

SUMMARY OF INVENTION

Technical Problem

However, due to the recent diversified applications of macromolecular materials, adding various functionalities to the macromolecular materials themselves has been required. For example, macromolecular materials are required to have further improved mechanical properties, such as stretchability, in addition to self-healing performance. It is also desired to establish a technique for the production of such macromolecular materials in a simpler way.

The present invention was made in view of these circumstances in the art. An object of the invention is to provide a macromolecular material that has self-healing properties, excellent stretchability, and a high degree of freedom in the design of stretchability, strength, and hardness, and that can be produced by a simple method; and to also provide a method for producing the same.

Solution to Problem

The present inventors conducted extensive research to achieve the object, and found that the object can be achieved by using a specific formulation for the polymer contained in the macromolecular material. The present inventors then completed the invention.

Specifically, the present invention includes, for example, the subject matter described in the following items.

Item 1. A macromolecular material comprising a polymer having a host group and a guest group,
wherein
the host group is a monovalent group formed by removing one hydrogen atom or hydroxy group from a cyclodextrin derivative,
the cyclodextrin derivative has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group,
the polymer is a polymer of a monomer mixture containing a host group-containing polymerizable monomer, a guest group-containing polymerizable monomer, and a third polymerizable monomer,
the third polymerizable monomer contains a (meth)acrylic ester compound, and
the host group-containing polymerizable monomer and the guest group-containing polymerizable monomer have a property of being dissolved in the third polymerizable monomer.

Item 2. The macromolecular material according to Item 1, wherein the third polymerizable monomer contains a water-soluble (meth)acrylic ester compound.

Item 3. The macromolecular material according to Item 1 or 2, wherein in the monomer mixture, the host group-containing polymerizable monomer and the guest group-containing polymerizable monomer are each contained in an amount of 0.01 to 10 mol % based on the total amount of the host group-containing polymerizable monomer, the guest group-containing polymerizable monomer, and the third polymerizable monomer.

Item 4. A method for producing the macromolecular material according to any one of Items 1 to 3, comprising:
dissolving a host group-containing polymerizable monomer and a guest group-containing polymerizable monomer in a third polymerizable monomer to prepare a monomer mixture; and
polymerizing the monomer mixture to obtain a polymer.

Advantageous Effects of Invention

The macromolecular material of the present invention has self-healing properties, excellent stretchability, and a high degree of freedom in the design of stretchability, strength, and hardness, and can be produced by a simple method.

BRIEF DESCRIPTION OF DRAWING

FIG. 1 (a) shows an example of an appearance photograph of a monomer mixture in which no solution is formed, and (b) shows an example of an appearance photograph of a monomer mixture in which a solution is formed.

DESCRIPTION OF EMBODIMENTS

Below, embodiments of the present invention are described in detail. The terms "comprise," "contain," and "include" in the present specification include the concepts of "comprise," "contain," "include," "consist essentially of," and "consist of."

The macromolecular material of the present invention comprises a polymer having a host group and a guest group. In the macromolecular material of the present invention, the host group is a monovalent group formed by removing one hydrogen atom or hydroxy group from a cyclodextrin derivative, and the cyclodextrin derivative has a structure formed such that a hydrogen atom of at least one hydroxy group contained in a cyclodextrin is replaced with at least one group selected from the group consisting of a hydrocarbon group, an acyl group, and —CONHR wherein R represents a methyl group or an ethyl group.

In particular, in the macromolecular material of the present invention, the polymer is a polymer of a monomer mixture containing a host group-containing polymerizable monomer, a guest group-containing polymerizable monomer, and a third polymerizable monomer, the third polymerizable monomer contains a (meth)acrylic ester compound, and the host group-containing polymerizable monomer and the guest group-containing polymerizable monomer have a property of being dissolved in the third polymerizable monomer.

The macromolecular material of the present invention has self-healing properties, excellent stretchability, and a high degree of freedom in the design of stretchability, strength, and hardness, and can be produced by a simple method.

The cyclodextrin derivative is at least one member selected from the group consisting of α-cyclodextrin derivatives, β-cyclodextrin derivatives, and γ-cyclodextrin derivatives. The cyclodextrin derivative as used in the present specification refers to a molecule with a structure formed such that a cyclodextrin molecule is substituted with a different organic group. Just to note, "cyclodextrin" in the present specification refers to at least one member selected from the group consisting of α-cyclodextrin, β-cyclodextrin, and γ-cyclodextrin.

In the present specification, the host group refers to a monovalent group formed by removing one hydrogen atom or hydroxy group from a cyclodextrin derivative. The removed hydrogen atom or hydroxy group may be of any site of the cyclodextrin derivative. From the standpoint of ease of forming a host group, the host group is preferably a monovalent group formed by removing one hydroxy group from a cyclodextrin derivative.

The cyclodextrin derivative has a structure formed such that at least one hydroxy group contained in a cyclodextrin is replaced with at least one group selected from the group consisting of a hydrocarbon group, an acyl group, and —CONHR wherein R represents a methyl group or an ethyl group.

In the present specification, "at least one group selected from the group consisting of a hydrocarbon group, an acyl group, and —CONHR wherein R represents a methyl group or an ethyl group" may be referred to as "a hydrocarbon group etc." for convenience.

The type of hydrocarbon group is not particularly limited. Examples of the hydrocarbon group include an alkyl group, an alkenyl group, and an alkynyl group.

The number of carbon atoms in the hydrocarbon group is not particularly limited. The number of carbon atoms in the hydrocarbon group is preferably 1 to 4 because the host group-containing polymerizable monomer is easily dissolved in the third polymerizable monomer, and the polymer easily forms host-guest interaction.

Specific examples of hydrocarbon groups having 1 to 4 carbon atoms include a methyl group, an ethyl group, a propyl group, and a butyl group. When the hydrocarbon group is a propyl group or a butyl group, the hydrocarbon group may be linear or branched.

The hydrocarbon group may be substituted, as long as the effects of the present invention are not impaired.

Examples of the acyl group include an acetyl group, a propionyl group, and a formyl group. The acyl group may be further substituted. The acyl group is preferably an acetyl group because the host group-containing polymerizable monomer is easily dissolved in the third polymerizable monomer, and the polymer easily forms host-guest interaction.

—CONHR wherein R represents a methyl group or an ethyl group is a methyl carbamate group or an ethyl carbamate group. —CONHR is preferably an ethyl carbamate group because the host group-containing polymerizable monomer is easily dissolved in the third polymerizable monomer, and the polymer easily forms host-guest interaction.

When the total number of hydroxy groups in a single molecule of a cyclodextrin is N, N of α-cyclodextrin is 18, N of β-cyclodextrin is 21, and N of γ-cyclodextrin is 24.

If the host group is a monovalent group formed by removing one "hydroxy group" from a cyclodextrin derivative, the maximum number of hydroxy groups whose hydrogens can be replaced with a hydrocarbon group etc. is N-1 per molecule of the cyclodextrin derivative. If the host group is a monovalent group formed by removing one "hydrogen atom" from a cyclodextrin derivative, the maximum number of hydroxy groups whose hydrogens can be replaced with a hydrocarbon group etc., is N per molecule of the cyclodextrin derivative.

The host group preferably has a structure such that the hydrogen atoms of at least 70% of the total number of hydroxy groups per molecule of the cyclodextrin derivative are replaced with a hydrocarbon group etc. In this case, the host group-containing polymerizable monomer is easily dissolved in the third polymerizable monomer. The host group more preferably has a structure such that the hydrogen atoms of at least 80% of the total number of hydroxy groups per molecule of the cyclodextrin derivative are replaced with a hydrocarbon group etc.; and particularly preferably has a structure such that the hydrogen atoms of at least 90% of the total number of hydroxy groups per molecule of the cyclodextrin derivative are replaced with a hydrocarbon group etc.

The host group preferably has a structure such that the hydrogen atoms of at least 13 hydroxy groups out of the total number of hydroxy groups per molecule of α-cyclodextrin derivative are replaced with a hydrocarbon group etc. In this case, the host group-containing polymerizable monomer is easily dissolved in the third polymerizable monomer. The host group more preferably has a structure such that the hydrogen atoms of at least 15 hydroxy groups out of the total number of hydroxy groups per molecule of α-cyclodextrin derivative are replaced with a hydrocarbon group etc.; and particularly preferably has a structure such that the hydrogen atoms of 17 hydroxy groups out of the total number of hydroxy groups per molecule of α-cyclodextrin derivative are replaced with a hydrocarbon group etc.

The host group preferably has a structure such that the hydrogen atoms of at least 15 hydroxy groups out of the total number of hydroxy groups per molecule of β-cyclodextrin derivative are replaced with a hydrocarbon group etc. In this case, the host group-containing polymerizable monomer is easily dissolved in the third polymerizable monomer. The host group more preferably has a structure such that the hydrogen atoms of at least 17 hydroxy groups out of the total number of hydroxy groups per molecule of β-cyclodextrin derivative are replaced with a hydrocarbon group etc.; and particularly preferably has a structure such that the hydrogen atoms of at least 19 hydroxy groups out of the total number of hydroxy groups per molecule of β-cyclodextrin derivative are replaced with a hydrocarbon group etc.

The host group preferably has a structure such that the hydrogen atoms of at least 17 hydroxy groups out of the total number of hydroxy groups per molecule of γ-cyclodextrin derivative are replaced with a hydrocarbon group etc. In this case, the host group-containing polymerizable monomer is easily dissolved in the third polymerizable monomer. The host group more preferably has a structure such that the hydrogen atoms of at least 19 hydroxy groups out of the total number of hydroxy groups per molecule of γ-cyclodextrin derivative are replaced with a hydrocarbon group etc.; and particularly preferably has a structure such that the hydrogen atoms of at least 21 hydroxy groups out of the total number of hydroxy groups per molecule of γ-cyclodextrin derivative are replaced with a hydrocarbon group etc.

In the present specification, the type of guest group is not limited, as long as it can form host-guest interaction with the host group, that is, as long as it can form a clathrate compound (clathrate complex) with the host group.

Examples of the guest group include $C_{3-30}$ linear or branched hydrocarbon groups, cycloalkyl groups, aryl groups, heteroaryl groups, and organometallic complexes. These may have one or more substituents. More specific examples of the guest group include $C_{4-18}$ chain or cyclic alkyl groups. The $C_{4-18}$ chain alkyl group may be linear or branched. The cyclic alkyl group may have a cage-shaped structure. The substituents are the same as those mentioned above. Examples include halogen atoms (e.g. fluorine, chlorine, and bromine), hydroxy groups, carboxyl groups, ester groups, amide groups, and hydroxy groups that may be protected.

Other examples of the guest group include monovalent groups formed by removing one atom (e.g., a hydrogen atom) from guest molecules. Examples of guest molecules include at least one member selected from the group consisting of alcohol derivatives, aryl compounds, carboxylic acid derivatives, amino derivatives, azobenzene derivatives having a cyclic alkyl group or a phenyl group, cinnamic acid derivatives, aromatic compounds and alcohol derivatives thereof, amine derivatives, ferrocene derivatives, azobenzene, naphthalene derivatives, anthracene derivatives, pyrene derivatives, perylene derivatives, clusters composed of carbon atoms such as fullerenes, and dansyl compounds.

Further specific examples of the guest group include a t-butyl group, an n-octyl group, an n-dodecyl group, an isobornyl group, and an adamantyl group.

In the macromolecular material of the present invention, the polymer having a host group and a guest group can be obtained by polymerizing a monomer mixture containing a host group-containing polymerizable monomer, a guest group-containing polymerizable monomer, and a third polymerizable monomer.

Host Group-Containing Polymerizable Monomer

The host group-containing polymerizable monomer is a compound that has a host group mentioned above and a polymerizable functional group. The host group is, for example, covalently attached to the side chain of the host group-containing polymerizable monomer. Examples of polymerizable functional groups include radically polymerizable functional groups, such as an acryloyl group ($CH_2$=CH(CO)—), a methacryloyl group ($CH_2$=$CCH_3$(CO)—), and groups containing a carbon-carbon double bond (e.g., styryl, vinyl, and allyl). These groups containing a carbon-carbon double bond may be further substituted to the extent that the radical polymerization properties are not interfered.

Specific examples of the host group-containing polymerizable monomer include vinyl polymerizable monomers to which the host group is attached. For example, the host group-containing vinyl monomer is a compound represented by the following formula (h1):

In formula (h1), Ra represents a hydrogen atom or a methyl group, $R^H$ represents the host group, and $R^1$ represents a divalent group formed by removing one hydrogen atom from a monovalent group selected from the group consisting of a hydroxy group, a thiol group, an alkoxy group optionally having at least one substituent, a thioalkoxy group optionally having at least one substituent, an alkyl group optionally having at least one substituent, an amino group optionally having one substituent, an amide group optionally having one substituent, an aldehyde group, and a carboxyl group.

Alternatively, the host group-containing polymerizable monomer is, for example, a compound represented by the following formula (h2):

In formula (h2), Ra, $R^H$, and $R^1$ are respectively synonymous with Ra, $R^H$, and $R^1$ in formula (h1).

Further, the host group-containing polymerizable monomer is, for example, a compound represented by the following formula (h3):

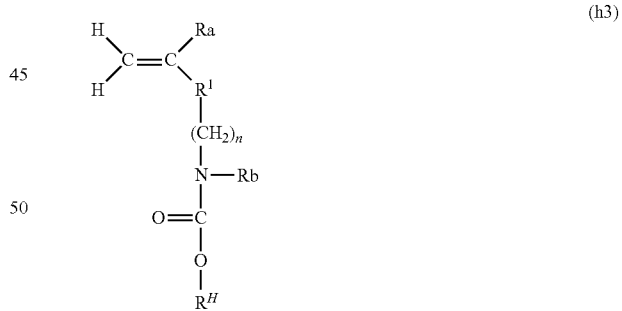

In formula (h3), Ra, $R^H$, and $R^1$ are respectively synonymous with Ra, $R^H$, and $R^1$ in formula (h1). n is an integer of 1 to 20, preferably 1 to 10, and more preferably 1 to 5. Rb represents hydrogen or a $C_{1-20}$ alkyl group (preferably a $C_{1-10}$ alkyl group, and more preferably a $C_{1-6}$ alkyl group).

Host group $R^H$ in the host group-containing polymerizable monomers represented by formulas (h1), (h2), and (h3) is an example of a monovalent group formed by removing one hydroxy group from a cyclodextrin derivative.

Moreover, the host group-containing polymerizable monomer may be one of the compounds represented by formulas (h1), (h2), and (h3) alone, or may contain two or more of them. In this case, Ra in formulas (h1), (h2), and (h3) are the same or different in some cases. Similarly, $R^H$ in formulas (h1), (h2), and (h3) are the same or different in some cases, and $R^1$ in formulas (h1), (h2), and (h3) are the same or different in some cases.

The substituents defined in formulas (h1) to (h3) are not particularly limited. Examples of the substituents include a $C_{1-20}$ alkyl group, a $C_{2-20}$ alkynyl group, a $C_{2-20}$ alkynyl group, a halogen atom, a carboxyl group, a carbonyl group, a sulfonyl group, a sulfone group, and a cyano group.

In formulas (h1) to (h3), when $R^1$ is a divalent group formed by removing one hydrogen atom from an amino group optionally having one substituent, the nitrogen atom of the amino group can be bonded to the carbon atom of the C=C double bond.

In formulas (h1) to (h3), when $R^1$ is a divalent group formed by removing one hydrogen atom from an amide group optionally having one substituent, the carbon atom of the amide group can be bonded to the carbon atom of the C=C double bond.

In formulas (h1) to (h3), when $R^1$ is a divalent group formed by removing one hydrogen atom from an aldehyde group, the carbon atom of the aldehyde group can be bonded to the carbon atom of the C=C double bond.

In formulas (h1) to (h3), when $R^1$ is a divalent group formed by removing one hydrogen atom from a carboxyl group, the carbon atom of the carboxyl group can be bonded to the carbon atom of the C=C double bond.

The host group-containing polymerizable monomers represented by formulas (h1) to (h3) are preferably, for example, (meth)acrylic acid ester derivatives (i.e., $R^1$ is —COO—) or (meth)acrylamide derivatives (i.e., $R^1$ is —CONH— or —CONR—, and R is synonymous with the substituent mentioned above). In this case, the polymerization reaction is likely to proceed, and the solubility in a third polymerizable monomer, described later, is excellent. In the present specification, "(meth)acrylic" means "acrylic" or "methacrylic," and "(meth)acrylate" means "acrylate" or "methacrylate."

R in —CONR— is, for example, preferably a $C_{1-20}$ alkyl group, more preferably a $C_{1-10}$ alkyl group, and particularly preferably a $C_{1-6}$ alkyl group.

In the present invention, the host group-containing polymerizable monomer is preferably an acrylate compound. Therefore, in formulas (h1) to (h3), Ra is preferably hydrogen.

Method for Producing Host Group-Containing Polymerizable Monomer

The method for producing the host group-containing polymerizable monomer is not particularly limited. For example, in the case of the host group-containing vinyl monomer mentioned above, the host group-containing polymerizable monomer can be obtained by reacting a polymerizable monomer not having a host group and cyclodextrin or a cyclodextrin derivative. The polymerizable monomer not having a host group is a vinyl compound other than the host group-containing polymerizable monomer, and is referred to below as "vinyl compound A."

When the host group-containing polymerizable monomer is obtained by reacting vinyl compound A and cyclodextrin, vinyl compound A is substituted with cyclodextrin to produce a cyclodextrin-substituted polymerizable monomer (hereinafter referred to as "CD-substituted polymerizable monomer"), and the hydrogen atom of the hydroxy group present in the cyclodextrin of the CD-substituted polymerizable monomer is replaced with a hydrocarbon group etc.

In the method for replacing the hydrogen atom of the hydroxy group present in the cyclodextrin with a hydrocarbon group etc., for example, a wide range of known alkylation reactions can be used. For example, the hydrogen atom can be replaced with a hydrocarbon group by reacting the CD-substituted polymerizable monomer with an alkyl halide in the presence of sodium hydride. In this case, a solution of an alkyl halide and the CD-substituted polymerizable monomer can be added dropwise to a suspension of sodium hydride. Alternatively, an alkyl halide, the CD-substituted polymerizable monomer, and sodium hydride can be mixed together at once. Examples of alkyl halides include methyl iodide, ethyl iodide, and propyl iodide.

On the other hand, in the method for replacing the hydrogen atom of the hydroxy group present in the cyclodextrin with an acyl group, such as an acetyl group, for example, a wide range of known acylation reactions can be used. For example, the hydrogen atom can be replaced with an acetyl group by reacting the CD-substituted polymerizable monomer with an acetyl halide in the presence of sodium hydride. In this case, a solution of an acetyl halide and the CD-substituted polymerizable monomer can be added dropwise to a suspension of sodium hydride. Alternatively, an acetyl halide, the CD-substituted polymerizable monomer, and sodium hydride can be mixed together at once. Examples of acetyl halides include acetyl bromide and acetyl iodide.

Other examples of the method for replacing the hydrogen atom of the hydroxy group present in the cyclodextrin with an acetyl group include a method of acetylating the CD-substituted polymerizable monomer using a solvent capable of trapping an acid such as pyridine in the presence of acetic anhydride or isopropyl acetate.

For the method for replacing the hydrogen atom of the hydroxy group present in the cyclodextrin with —CONHR wherein R represents a methyl group or an ethyl group, for example, a wide range of known alkyl carbamate formation reactions can be used. For example, the hydrogen atom of the hydroxy group present in the host group can be replaced with —CONHR by reacting the CD-substituted polymerizable monomer in an organic solvent (e.g., DMSO) in the presence of an alkyl isocyanate. Examples of alkyl isocyanates include methyl isocyanate and ethyl isocyanate.

When a host group-containing polymerizable monomer is obtained by reacting vinyl compound A and a cyclodextrin derivative, the cyclodextrin derivative can be a compound in which the hydrogen atom of at least one hydroxy group in cyclodextrin is replaced with a hydrocarbon group etc. This cyclodextrin derivative can be obtained, for example, by reacting cyclodextrin with the alkyl halide, acetyl halide, or alkyl isocyanate in the presence of sodium hydride.

Examples of vinyl compound A include compounds represented by the following formula (5), (6), or (9):

(5)

-continued

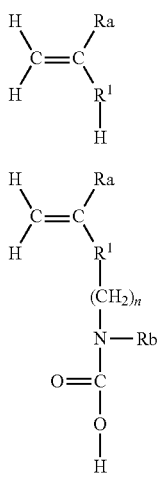

(6)

(9)

In formulas (5), (6), and (9), Ra represents a hydrogen atom or a methyl group, and $R^1$ is synonymous with $R^1$ in formula (h1). Further, in formula (9), Rb and n are respectively synonymous with Rb and n in formula (h3).

When the compound represented by formula (5) is used as vinyl compound A, the resulting host group-containing polymerizable monomer is a compound represented by formula (h1). When the compound represented by formula (6) is used as vinyl compound A, the resulting host group-containing polymerizable monomer is a compound represented by formula (h2). When the compound represented by formula (9) is used as vinyl compound A, the resulting host group-containing polymerizable monomer is a compound represented by formula (h3).

Specific examples of the method for producing the host group-containing polymerizable monomer using vinyl compound A include a method comprising the step of subjecting vinyl compound A and a cyclodextrin derivative in which the hydrogen atom of at least one hydroxy group is replaced with a hydrocarbon group etc., to dehydration condensation in a solvent, optionally in the presence of an acid catalyst.

Specific examples of the method for producing the host group-containing polymerizable monomer using vinyl compound A also include a method comprising the step of subjecting vinyl compound A and a cyclodextrin to dehydration condensation in a solvent, optionally in the presence of an acid catalyst. In this method, the target host group-containing polymerizable monomer can be obtained by further performing the step of replacing the hydrogen atom of at least one hydroxy group contained in the product obtained by dehydration condensation with a hydrocarbon group etc. The method for replacing a hydrogen atom with a hydrocarbon group etc., may be the same as the method described above.

Dehydration condensation can be performed, for example, in the presence of an acid catalyst. The acid catalyst can be any catalyst, and can be selected from a wide range of known catalysts. Examples include p-toluenesulfonic acid, aluminum chloride, and hydrochloric acid. The amount of an acid catalyst for use may be, for example, typically 20 mol % or less, and preferably 10 mol % or less, based on the cyclodextrin or cyclodextrin derivative; and typically 0.001 mol % or more, preferably 0.01 mol % or more, and more preferably 0.1 mol % or more, based on the cyclodextrin or cyclodextrin derivative.

The solvent for use in the reaction can also be any solvent. Examples include water, dimethylformamide, dimethyl sulfoxide, and N-methylpyrrolidone. In particular, from the standpoint of ease of adjusting the concentration of the acid and convenience in controlling the reaction, the solvent is preferably dimethylformamide, dimethyl sulfoxide, or N-methylpyrrolidone, and particularly preferably dimethylformamide. The reaction temperature and reaction time for dehydration condensation are also not limited, and dehydration condensation can be performed under appropriate conditions. From the standpoint of promptly performing the reaction, the reaction temperature is preferably 25 to 90° C., and the reaction time is preferably 1 minute to 3 hours. The reaction time is more preferably 5 minutes to 1 hour. After the reaction, purification may be performed by a known purification technique.

Guest Group-Containing Polymerizable Monomer

The guest group-containing polymerizable monomer is a compound having a guest group mentioned above and a polymerizable functional group. The host group is, for example, covalently attached to the side chain of the guest group-containing polymerizable monomer. The polymerizable functional group is the same as that of the host group-containing polymerizable monomer.

Specific examples of the guest group-containing polymerizable monomer include vinyl polymerizable monomers to which the guest group is attached. For example, the guest group-containing vinyl monomer is a compound represented by the following formula (g1):

(g1)

In formula (g1), Ra represents a hydrogen atom or a methyl group, RG represents the guest group, and $R^2$ is synonymous with $R^1$ in formula (h1).

Among the polymerizable monomers represented by formula (g1), preferable is a (meth)acrylic acid ester or a derivative thereof (i.e., $R^2$ is —COO—), or (meth)acrylamide or a derivative thereof (i.e., $R^1$ is —CONH— or —CONR—, and R is synonymous with the substituent mentioned above). In this case, the polymerization reaction is likely to proceed, and the solubility in a third polymerizable monomer, described later, is excellent.

Specific examples of guest group-containing vinyl monomers include n-hexyl (meth)acrylate, n-octyl (meth)acrylate, n-dodecyl (meth)acrylate, adamantyl (meth)acrylate, hydroxyl adamantyl (meth)acrylate, 1-(meth)acrylamide adamantane, 2-ethyl-2-adamantyl (meth)acrylate, N-dodecyl (meth)acrylamide, t-butyl (meth) acrylate, 1-acrylamide adamantane, N-(1-adamantyl) (meth) acrylamide, N-benzyl (meth) acrylamide, N-1-naphthylmethyl (meth) acrylamide, ethoxylated O-phenylphenol acrylate, phenoxypolyethylene glycol acrylate, isostearyl acrylate, nonylphenol EO adduct acrylate, and isobornyl (meth)acrylate.

In the present invention, the guest group-containing polymerizable monomer is preferably an acrylate compound. Therefore, in formula (g1), Ra is preferably hydrogen.

The guest group-containing vinyl monomer can be produced by a known method. Further, the guest group-containing polymerizable monomer is available from commercial products.

Third Polymerizable Monomer

In the monomer mixture, the third polymerizable monomer is not particularly limited, as long as it is a monomer that is capable of dissolving the host group-containing polymerizable monomer and the guest group-containing polymerizable monomer. Just to note, the third polymerizable monomer is a compound other than the host group-containing polymerizable monomer and the guest group-containing polymerizable monomer.

The phrase "the host group-containing polymerizable monomer and the guest group-containing polymerizable monomer are dissolved in the third polymerizable monomer" means that the mixture of the host group-containing polymerizable monomer and the guest group-containing polymerizable monomer in a total amount of 1 part by weight or more is dissolved per 100 parts by weight of the third polymerizable monomer at a temperature of 20° C. It is preferable that the mixture of the host group-containing polymerizable monomer and the guest group-containing polymerizable monomer in a total amount of 1 part by weight or more, and particularly preferably 10 parts by weight or more, is dissolved per 100 parts by weight of the third polymerizable monomer at a temperature of 20° C.

In the present specification, "dissolve" means that a transparent solution is formed by mixing by stirring or other means. Further, "rapidly dissolve" means that a transparent solution is formed simply by mixing, without stirring or other means.

Examples of the third polymerizable monomer include various vinyl polymerizable monomers; in particular, a (meth)acrylic ester compound is preferably contained.

When the third polymerizable monomer is a (meth)acrylic ester compound, the type thereof is not particularly limited. For example, the number of carbon atoms in the side chain of the (meth)acrylic ester compound (provided that the COO bond in the ester is not included) is preferably 3 or more, and more preferably 4 or more. Further, the number of carbon atoms in the side chain of the (meth)acrylic ester compound (provided that the COO bond in the ester is not included) is preferably 10 or less, and more preferably 8 or less. The side chain of the (meth)acrylic ester compound refers to a substituent attached to the carbon atom of the carbon-carbon double bond, which is the main chain, and containing an ester bond.

Other specific examples of the (meth)acrylic ester compound include water-insoluble (meth)acrylates, such as 2-ethylhexyl acrylate, n-octyl acrylate, 2-methoxyethyl acrylate, tetrahydrofurfuryl acrylate, and 2-phenylethyl acrylate; and water-soluble (meth)acrylates, such as 4-hydroxybutyl acrylate. Preferable water-insoluble (meth)acrylates are 2-methoxyethyl acrylate, tetrahydrofurfuryl acrylate, and 2-phenylethyl acrylate.

In the present specification, a compound being "water-soluble" means that 1 part by weight or more of the compound is dissolved per 100 parts by weight of water at a temperature of 20° C. The water-soluble compound is preferably dissolved in an amount of 20 parts by weight or more, and particularly preferably 50 parts by weight or more, per 100 parts by weight of water at a temperature of 20° C.

The third polymerizable monomer may be a single water-insoluble (meth)acrylate or may contain two or more water-insoluble (meth)acrylates. Further, the third polymerizable monomer may be a single water-soluble (meth)acrylate, or may contain two or more water-soluble (meth)acrylates. When the third polymerizable monomer is a single water-soluble (meth)acrylate, it is 4-hydroxybutyl acrylate, for example.

Furthermore, the third polymerizable monomer may be a mixture of one or two or more water-insoluble (meth)acrylates and one or two or more water-soluble (meth)acrylates. When the third polymerizable monomer contains a water-soluble (meth)acrylate in addition to a water-insoluble (meth)acrylate, the macromolecular material can have self-healing properties as well as excellent elongation performance and flexibility.

When the third polymerizable monomer contains a water-insoluble (meth)acrylate and a water-soluble (meth)acrylate, the mixing ratio of both may be any ratio as long as the host group-containing polymerizable monomer and the guest group-containing polymerizable monomer can be dissolved. For example, the amount of the host group-containing polymerizable monomer can be set to 1 to 99 wt %, preferably 10 to 90 wt %, and more preferably 20 to 80 wt %, based on the total amount of the host group-containing polymerizable monomer and the guest group-containing polymerizable monomer.

The third polymerizable monomer may contain, if necessary, water-soluble (meth)acrylamide or a derivative thereof, together with the (meth)acrylic ester compound. Examples of (meth)acrylamide derivatives include N,N-dimethyl (meth)acrylamide. When the third polymerizable monomer contains water-soluble (meth)acrylamide or a derivative thereof, the macromolecular material can have excellent rupture force and flexibility.

When the third polymerizable monomer contains water-soluble (meth)acrylamide or a derivative thereof, the (meth)acrylic ester compound is particularly preferably one or more members selected from the group consisting of 4-hydroxybutyl acrylate and 2-methoxyethyl acrylate. In this case, the water-soluble (meth)acrylamide or derivative thereof is particularly preferably N,N-dimethyl (meth)acrylamide.

When the third polymerizable monomer contains water-soluble (meth)acrylamide or a derivative thereof, the content thereof can be 1 to 80 wt %, preferably 3 to 60 wt %, and more preferably 5 to 50 wt %, based on the total amount of the third polymerizable monomer. In particular, when the third polymerizable monomer contains a combination of 4-hydroxybutyl acrylate and N,N-dimethylacrylamide, the content of 4-hydroxybutyl acrylate is preferably 50 wt % or more, more preferably 60 wt % or more, even more preferably 70 wt % or more, and particularly preferably 80 wt % or more, based on the total amount of both monomers. Further, when the third polymerizable monomer contains a combination of 2-methoxyethyl acrylate and N,N-dimethylacrylamide, the content of 2-methoxyethyl acrylate is preferably 50 wt % or more, more preferably 60 wt % or more, and particularly preferably 70 wt % or more, based on the total amount of both monomers.

In the present invention, all of the (meth)acrylic ester compounds contained in the third polymerizable monomer are preferably acrylate compounds. Further, all of the (meth)acrylamides contained in the third polymerizable monomer are preferably acrylamides, and all of the (meth)acrylamide derivatives contained in the third polymerizable monomer are preferably acrylamide derivatives.

It is possible to freely design the stretchability, strength, and hardness of the resulting macromolecular material by appropriately designing the type and combination of third polymerizable monomers. That is, the macromolecular material of the present invention has a high degree of freedom in the design of stretchability, strength, and hardness.

Monomer Mixture

The monomer mixture contains the host group-containing polymerizable monomer, the guest group-containing polymerizable monomer, and the third polymerizable monomer. As long as the effects of the present invention are not impaired, the monomer mixture may contain one or more monomers other than the host group-containing polymerizable monomer, the guest group-containing polymerizable monomer, and the third polymerizable monomer. When the monomer mixture contains one or more other monomers, the amount thereof can be set to 5 wt % or less, preferably 1 wt % or less, more preferably 0.1 wt % or less, and particularly preferably 0.05 wt % or less, based on the total amount of the monomer mixture.

In the monomer mixture, the content ratio of the host group-containing polymerizable monomer, the guest group-containing polymerizable monomer, and the third polymerizable monomer is not particularly limited. These monomers can be contained at any ratio, as long as the effects of the present invention are not impaired. For example, in the monomer mixture, the content of each of the host group-containing polymerizable monomer and the guest group-containing polymerizable monomer is preferably 0.01 to 10 mol % based on the total amount of the host group-containing polymerizable monomer, the guest group-containing polymerizable monomer, and the third polymerizable monomer. In this case, the host group-containing polymerizable monomer and the guest group-containing polymerizable monomer are easily dissolved in the third polymerizable monomer, and a macromolecular material having self-healing properties and excellent stretchability can be easily obtained.

In the monomer mixture, the content of the host group-containing polymerizable monomer is preferably 0.05 mol % or more, and particularly preferably 0.1 mol % or more, based on the total amount of the host group-containing polymerizable monomer, the guest group-containing polymerizable monomer, and the third polymerizable monomer. In the monomer mixture, the content of the host group-containing polymerizable monomer is more preferably 8 mol % or less, even more preferably 5 mol % or less, and particularly preferably 3 mol % or less, based on the total amount of the host group-containing polymerizable monomer, the guest group-containing polymerizable monomer, and the third polymerizable monomer.

In the monomer mixture, the content of the guest group-containing polymerizable monomer is preferably 0.05 mol % or more, and particularly preferably 0.1 mol % or more, based on the total amount of the host group-containing polymerizable monomer, the guest group-containing polymerizable monomer, and the third polymerizable monomer. In the monomer mixture, the content of the guest group-containing polymerizable monomer is more preferably 8 mol % or less, even more preferably 5 mol % or less, and particularly preferably 3 mol % or less, based on the total amount of the host group-containing polymerizable monomer, the guest group-containing polymerizable monomer, and the third polymerizable monomer.

In the monomer mixture, the host group-containing polymerizable monomer, the guest group-containing polymerizable monomer, and the third polymerizable monomer can be combined in any way, and the effects of the present invention are not impaired even when the monomers listed above are combined in any way.

For example, in the monomer mixture, when the host group of the host group-containing polymerizable monomer is a group derived from α-cyclodextrin, the guest group of the guest group-containing polymerizable monomer is preferably at least one member selected from the group consisting of an octyl group and a dodecyl group. In this case, the host group and the guest group easily form a clathrate complex in a polymer described below, thereby easily exhibiting excellent self-healing performance.

In the monomer mixture, when the host group of the host group-containing polymerizable monomer is a group derived from β-cyclodextrin, the guest group of the guest group-containing polymerizable monomer is preferably at least one member selected from the group consisting of an adamantyl group and an isobornyl group. In this case, the host group and the guest group easily form a clathrate complex in a polymer described below, thereby easily exhibiting excellent self-healing performance.

In the monomer mixture, when the host group of the host group-containing polymerizable monomer is a group derived from γ-cyclodextrin, the guest group of the guest group-containing polymerizable monomer is at least one member selected from the group consisting of a cyclododecyl group and an adamantyl group. In this case, the host group and the guest group easily form a clathrate complex in a polymer described below, thereby easily exhibiting excellent self-healing performance.

In the combination of the host group-containing polymerizable monomer and the guest group-containing polymerizable monomer having a preferable combination of a host group and a guest group, the third polymerizable monomer particularly preferably contains one or more of 2-methoxyethyl acrylate, tetrahydrofurfuryl acrylate, 2-phenylethyl acrylate, and 4-hydroxybutyl acrylate. In this case, the third polymerizable monomer preferably also contains N,N-dimethyl (meth)acrylamide, as described above.

The method for preparing the monomer mixture is also not particularly limited. For example, the monomer mixture can be obtained by mixing predetermined amounts of the host group-containing polymerizable monomer, the guest group-containing polymerizable monomer, and the third polymerizable monomer by a suitable mixing method. The mixing method is not particularly limited, and a wide range of known mixing methods can be used.

Each monomer can be mixed to thereby obtain a solution in which the host group-containing polymerizable monomer and the guest group-containing polymerizable monomer are dissolved in the third polymerizable monomer.

To obtain the monomer mixture, each monomer may be mixed and heated. However, since the monomer mixture contains the host group-containing polymerizable monomer, the guest group-containing polymerizable monomer, and the third polymerizable monomer, a solution can be formed without the need for heating means. For example, the monomer mixture can be obtained by mixing each monomer at room temperature (e.g., less than 40° C., preferably 5 to 35° C., and more preferably 15 to 25° C.). Further, since the monomer mixture can easily form a solution, it can be prepared without applying external stimuli, such as sonication.

Polymer

The polymer contained in the macromolecular material is formed by polymerizing the monomer mixture, and this polymer has a host group and a guest group mentioned above. The preferable combination of a host group and a guest group is as described above, and the same applies to the polymer. The host group and the guest group are both, for example, covalently attached to the side chain of the polymer.

The method for polymerizing the monomer mixture to obtain a polymer is not particularly limited, and a wide range of known polymerization reactions can be used.

In the polymerization reaction, a polymerization initiator can be used, in addition to the monomer mixture. The type of polymerization initiator is not particularly limited, and known polymerization initiators can be used. Examples of polymerization initiators include persulfate compounds, such as ammonium persulfate; azo compounds, such as azobisisobutyronitrile; peroxides, such as di-tert-butyl peroxide, tert-butyl hydroperoxide, and benzoyl peroxide; and photopolymerization initiators, such as Irgacure (registered trademark) series. The concentration of a radically polymerizable polymerization initiator can be set to, for example, 0.01 to 10 mol %, preferably 0.1 to 5 mol %, and more preferably 0.2 to 4 mol %, based on the total amount of the monomer mixture.

The mode of the polymerization reaction is also not particularly limited. Methods such as thermal polymerization and photopolymerization can be widely used, depending on the type of polymerization initiator used. When photopolymerization is used, ultraviolet rays (e.g., UV light with a wavelength of 200 to 405 nm) can be used as a light source. The temperature of the polymerization reaction is also not limited. For example, the polymerization reaction can be performed at 0 to 100° C., and preferably 20 to 25° C. The time of the polymerization reaction is also not particularly limited, and can be 1 minute to 24 hours, and preferably 1 minute to 5 hours.

A solvent may be used in the polymerization reaction. When a solvent is used, the type of solvent is not particularly limited, and the amount of the solvent used is also not particularly limited. Alternatively, the polymerization reaction can be performed in the absence of a solvent. In particular, since the monomer mixture is a solution, the polymerization reaction can be easily performed without using a solvent. That is, a bulk polymerization method can be used for the polymerization of the monomer mixture.

The polymer obtained as described above can be directly used as a macromolecular material, or can be combined with other materials to form a macromolecular material.

Since the polymer is formed by polymerizing the monomer mixture, the structural units of the polymer include a structural unit derived from the host group-containing polymerizable monomer, a structural unit derived from the guest group-containing polymerizable monomer, and a structural unit derived from the third polymerizable monomer. The ratio (molar ratio) of these structural units can be considered to match with the molar ratio of monomers used to produce the polymer.

Macromolecular Material

The macromolecular material has excellent self-healing properties as well as excellent stretchability and flexibility because it contains the above polymer. In particular, since the polymer has a host group and a guest group mentioned above, host-guest interaction is formed between the molecules of the polymer, thereby exhibiting self-healing properties and stretchability. In particular, since the polymer forms host-guest interaction, even if the macromolecular material is cut, adhering the cut surfaces of the macromolecular material to each other allows the cut surfaces to form host-guest interaction again between the polymers. As a result, the macromolecular material can self-heal.

In addition, it is possible to freely design the stretchability, strength, and hardness of the macromolecular material by appropriately selecting each monomer for forming the polymer contained in the macromolecular material. The macromolecular material has a high degree of freedom in the design thereof. In particular, when two or more different monomers are combined as third polymerizable monomers, monomer units that have been difficult to introduce into the polymer can be introduced into the polymer, whereby the characteristics of the macromolecular material can be widely controlled.

The shape of the macromolecular material of the present invention is not particularly limited, and various shapes can be taken depending on the intended use. The macromolecular material can be in various forms, such as thin membranes, films, plates, blocks, sheets, rods, spheres, elliptical spheres, distorted shapes, or fibers.

The method for producing the macromolecular material of the present invention is not particularly limited, and various methods can be used. For example, the method for producing the macromolecular material can comprise dissolving a host group-containing polymerizable monomer and a guest group-containing polymerizable monomer in a third polymerizable monomer to prepare a monomer mixture, and polymerizing the monomer mixture to obtain a polymer. For the method for preparing a monomer mixture and the method for polymerizing the monomer mixture to obtain a polymer, the same methods and conditions as those mentioned above can be used.

The macromolecular material of the present invention has excellent self-healing properties, excellent stretchability, and excellent flexibility, and thus can be used for various applications. For example, the macromolecular material of the present invention can be preferably used for water-resistant electronic components, such as electrode separators and cushioning materials for electronic boards; building materials, such as painting, exterior walls, and concrete; interior parts of vehicles etc.; stationery, toys, and furniture; and other various components for use at high altitudes, in spacecraft, on the seabed, etc., where maintenance is difficult.

EXAMPLES

Below, the present invention is described in more detail with reference to Examples. However, the present invention is not limited to the embodiments of the Examples.

Production Example 1: Production of Ac-CDAA 0.95 mmol of a compound represented by the following formula (1-1) was weighed in a Schlenk flask, and subjected to nitrogen substitution.

(1-1)

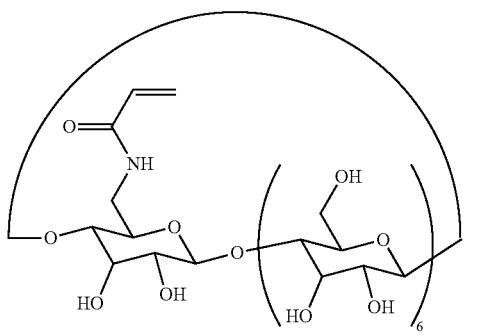

The compound represented by formula (1-1) was produced as follows. 5 g of β-cyclodextrin, 700 mg of acrylamide, and 95 mg of p-toluenesulfonic acid monohydrate were weighed and placed into a 200-mL round-bottom glass flask. This mixture was then added to 25 mL of N,N-dimethylformamide, thereby preparing a reaction mixture. The reaction mixture was heated to 90° C. in an oil bath, and heated with stirring over 1 hour, thereby obtaining a reaction mixture. Subsequently, the reaction mixture was cooled, and poured into 45 mL of strongly stirred acetone. The formed precipitates were filtered, and washed with 10 mL of acetone three times, followed by drying under reduced pressure at room temperature for one hour, thereby obtaining a reaction product. The reaction product was dissolved in 100 mL of distilled water, and passed through a column packed with a porous polystyrene resin (Mitsubishi Chemical Corporation, Diaion HP-20) (apparent density: 600 g/L) to allow for adsorption for 30 minutes. Instead of the column, preparative high-pressure liquid chromatography may be used for separation and purification. Thereafter, the solution component was removed, and 50 mL of a 10% methanol (or acetonitrile) aqueous solution was newly passed through the column three times to wash the polystyrene resin, thereby removing unreacted β-cyclodextrin. Subsequently, 500 mL of a 25% methanol aqueous solution was passed through the column twice to elute N-β-cyclodextrin acrylamide (hereinafter referred to as "βCDAAm"), which is the desired product. The solvent was removed under reduced pressure, thereby obtaining 809 mg of a compound (βCDAAm) represented by formula (1-1), which was a white powder. The yield was about 15%.

20 g of βCDAAm was dissolved in 300 mL of pyridine, 170.133 g of acetic anhydride was added, and the mixture was stirred at 55° C. for 12 hours or longer. Then, 50 mL of methanol was added for quenching, and the mixture was concentrated with an evaporator until the content reached 200 mL. The obtained concentrate was added dropwise to 2000 mL of water, and the formed precipitate was collected. The precipitate was dissolved in 200 mL of acetone, and added dropwise to 2000 mL of water, and the formed precipitate was collected, and dried under reduced pressure to isolate Ac-CDAA, which was the desired product. From the results of mass spectrum and NMR spectrum, it was confirmed that the desired Ac-CDAA was produced. It was confirmed that all of the hydroxy groups (100%) that were present per molecule of the cyclodextrin derivative in Ac-CDAA were replaced with an acetyl group. Therefore, it was found that Ac-CDAA was a compound in which the hydrogen atom of the hydroxy group was replaced with an acetyl group in formula (1-1).

Example 1

Ac-CDAA obtained in Production Example 1 was prepared as the host group-containing polymerizable monomer, N-(1-adamantyl) acrylamide (hereinafter referred to as "ADAA," produced by Yushiro Chemical Industry Co., Ltd.) was prepared as the guest group-containing polymerizable monomer, and water-soluble 4-hydroxybutyl acrylate (hereinafter referred to as "4HBA," produced by Tokyo Chemical Industry Co., Ltd.) was prepared as the third polymerizable monomer. These were mixed in the amounts (parts by weight) shown in Table 1 below to prepare a monomer mixture. This monomer mixture was prepared by mixing the monomers at 23° C., and stirring the mixture with a magnetic stirrer at 60 rpm for 30 minutes.

Irgacure 184 (registered trademark) was added as a photopolymerization initiator to the obtained monomer mixture in the amount (wt %) shown in Table 1, and the monomer mixture was polymerized by irradiation with ultraviolet rays. In this polymerization reaction, the monomer mixture was placed in a mold with a size of 70×10×3 mm made of a silicon sheet, and the polymerization reaction was performed by irradiation using an ultraviolet irradiation device ("SLUV-8," produced by AS ONE Corporation) at an ultraviolet wavelength of 366 nm and an irradiation strength of 1.6 to 1.7 mW/cm² (actual measured value) for 5 minutes. A polymer was obtained by the polymerization reaction.

Example 2

A polymer was obtained in the same manner as in Example 1, except that water-insoluble 2-methoxyethyl acrylate (hereinafter abbreviated as "2MEA") was used in place of 4HBA, and the amount of each raw material was changed as shown in Table 1.

Example 3

A polymer was obtained in the same manner as in Example 1, except that water-insoluble tetrahydrofurfuryl acrylate (hereinafter referred to as "THFA," produced by Tokyo Chemical Industry Co., Ltd.) was used in place of 4HBA, and the amount of each raw material was changed as shown in Table 1.

Example 4

A polymer was obtained in the same manner as in Example 1, except that water-insoluble 2-phenylethyl acrylate (hereinafter referred to as "2PhEA," produced by Tokyo Chemical Industry Co., Ltd.) was used in place of 4HBA, and the amount of each raw material was changed as shown in Table 1.

Example 5

A polymer was obtained in the same manner as in Example 1, except that water-insoluble ethyl acrylate (hereinafter referred to as "EA," produced by Tokyo Chemical Industry Co., Ltd.) was used in place of 4HBA, and the amount of each raw material was changed as shown in Table 1.

The following experiments of Comparative Examples 1 to 3 were carried out for the purpose of obtaining polymers with low rupture force and elongation.

Comparative Example 1

An attempt was made to obtain a polymer in the same manner as in Example 1, except that water-insoluble 2-ethylhexyl acrylate (hereinafter referred to as "2EHA," produced by Tokyo Chemical Industry Co., Ltd.) was used in place of 4HBA. However, this monomer could not dissolve Ac-CDAA and ADAA. As a result, a polymer with excellent stretchability could not be obtained.

Comparative Example 2

An attempt was made to obtain a polymer in the same manner as in Example 1, except that water-insoluble octyl acrylate (hereinafter referred to as "OctA," produced by Tokyo Chemical Industry Co., Ltd.) was used in place of 4HBA. However, this monomer could not dissolve Ac-CDAA and ADAA. As a result, a polymer with excellent stretchability could not be obtained.

Comparative Example 3

A polymer was obtained in the same manner as in Example 1, except that water-soluble N,N-dimethylacrylamide (hereinafter referred to as "DMAA," produced by Tokyo Chemical Industry Co., Ltd.) was used in place of 4HBA, and the amount of each raw material was changed as shown in Table 1.

Examples 6 to 9

Polymers were obtained in the same manner as in Example 1, except that in the preparation of a monomer mixture, the amounts of Ac-CDAA, ADAA, and 4HBA were changed as shown in Table 2 below.

Examples 10 to 12

Polymers were obtained in the same manner as in Example 1, except that a mixture of 4HBA and 2EHA (2-ethylhexyl acrylate) was used in place of 4HBA as the third polymerizable monomer, and the amount of each raw material was changed as shown in Table 3 below.

Examples 13 and 14

Polymers were obtained in the same manner as in Example 1, except that a mixture of 4HBA and DMAA was used in place of 4HBA as the third polymerizable monomer, and the amount of each raw material was changed as shown in Table 4 below.

Examples 15 and 16

Polymers were obtained in the same manner as in Example 1, except that a mixture of 2MEA and DMAA was used in place of 4HBA as the third polymerizable monomer, and the amount of each raw material was changed as shown in Table 4 below.

Evaluation Method

Solubility

The various monomers prepared in the Examples and Comparative Examples were prepared separately. Then, a dissolution test was conducted at 20° C. at the mixing ratios shown in Tables 1 to 4, and the state of dissolution was visually observed and evaluated according to the following criteria.

⊚: The monomers were dissolved without stirring the monomer mixture.
○: The monomers were dissolved by stirring the monomer mixture.
×: The monomers were not dissolved even by stirring the monomer mixture.

FIG. 1 (a) is an example of an appearance photograph of a monomer mixture in which the monomers were not dissolved (i.e., no solution was formed), and (b) is an example of an appearance photograph of a monomer mixture in which the monomers were dissolved (i.e., a solution was formed).

The solubility of Ac-CDAA (host group-containing polymerizable monomer) in the following various monomers (third polymerizable monomers) was as follows:
less than 1 g for 100 g of 2EHA (20° C.)
less than 1 g for 100 g of OctA (octyl acrylate) (20° C.)
10 g or more for 100 g of 2MEA (20° C.)
10 g or more for 100 g of 4HBA (20° C.)
10 g or more for 100 g of DMAA (20° C.)

Further, the solubility of ADAA (guest group-containing polymerizable monomer) in the following various monomers (third polymerizable monomers) was as follows:
less than 1 g for 100 g of 2EHA (20° C.)
less than 1 g for 100 g of OctA (20° C.)
10 g or more for 100 g of 2MEA (20° C.)
10 g or more for 100 g of 4HBA (20° C.)
10 g or more for 100 g of DMAA (20° C.)

Moreover, the solubility of the following various monomers (third polymerizable monomers) in water was as follows:
less than 0.1 g of both 2EHA and OctA for 100 g of water (20° C.)
50 g or more of 4HBA and DMAA for 100 g of water (20° C.)

Odor

The odor of the polymers obtained in the Examples and Comparative Examples was evaluated by a sensory test and determined according to the following criteria.
○: Weaker odor than ethyl acrylate
×: Stronger odor and more discomfort than ethyl acrylate Evaluation of Rupture Force and Elongation of Macromolecular Material Macromolecular materials (thickness: 3 mm) formed from the polymers obtained in the Examples and Comparative Examples were subjected to a stroke-load curve test (Autograph AGX-plus, produced by Shimadzu Corporation) to observe the rupture point of each macromolecular material. With this rupture point taken as the final point, the maximum stress applied until the final point was determined to be the rupture force of the macromolecular material. This test was performed with the bottom end of the macromolecular material fixed, and the upper end pulled at a tension rate of 100 mm/min (upward operation). Further, a value obtained by dividing the stroke at that time, that is, the maximum length when the macromolecular material was pulled, by the length of the macromolecular gel before pulling was calculated as elongation.

Self-Healing Properties of Macromolecular Material

Macromolecular materials (thickness: 3 mm) formed from the polymers obtained in the Examples and Comparative Examples were cut in the center to divide them into two parts. Both parts were then brought into contact with each other at 80° C. for 24 hours for rejoining them, thereby obtaining test pieces. The test pieces were evaluated in the same manner as in the "Evaluation of Rupture Force and Elongation of Macromolecular Material" section above to measure the rupture force and elongation. The rate of change in rupture force and elongation before and after cutting was calculated. This value was regarded as the recovery rate, and the recovery rate was used as an index of self-healing performance.

Hardness of Macromolecular Material

The hardness of the macromolecular materials (thickness: 6 mm) was measured with Asker Rubber Hardness Tester (JIS A TYPE) produced by Kobunshi Keiki Co., Ltd. The 6-mm-thick macromolecular materials were prepared by using a 70×10×6 mm mold in place of the 70×10×3 mm mold in each Example.

Evaluations Results

Table 1 shows the main raw materials and their amounts used in the production of polymers in Examples 1 to 5 and Comparative Examples 1 to 3, as well as the evaluation results of the obtained polymers. In all of the polymers obtained in Examples 1 to 5, the molar ratio of the host group-containing polymerizable monomer, the guest group-containing polymerizable monomer, and the third polymerizable monomer is 1:1:98.

As shown in Table 1, the solubility of the monomer mixtures used in Examples 1 to 5 was evaluated as "⊚" or "○." Thus, it was revealed that these monomer mixtures had excellent solubility, and a solution was formed. That is, the host group-containing polymerizable monomer and the guest group-containing polymerizable monomer used in Examples 1 to 5 were easily dissolved in the third polymerizable monomers. Since all of these polymers had excellent stretchability, high rupture stress, and a high recovery rate, it was found that they had excellent self-healing properties.

Table 2 shows the main raw materials and their amounts used in the production of polymers in Examples 1 and 6 to 9, as well as the evaluation results of the obtained polymers. In all of Examples 1 and 6 to 9, the used host group-containing polymerizable monomer and guest group-containing polymerizable monomer were easily dissolved in the third polymerizable monomer. Since all of these polymers had excellent stretchability, high rupture stress, and a high recovery rate, it was found that they had excellent self-healing properties. Therefore, in the monomer mixture, the host group-containing polymerizable monomer and the guest group-containing polymerizable monomer can exist in a wide range of molar ratios, that is, the host group and the guest group contained in the polymer can be present in a wide range of molar ratios.

Table 3 shows the main raw materials and their amounts used in the production of polymers in Examples 1 and 10 to 12 and Comparative Example 1, as well as the evaluation results of the obtained polymers. Since the polymers of Examples 1 and 10 to 12 had excellent stretchability, high rupture stress, and a high recovery rate, it was found that they had excellent self-healing properties. The results indicate that the macromolecular materials have the desired performance even when combining water-soluble and water-insoluble (meth)acrylic ester compounds as the third polymerizable monomers.

Table 4 shows the main raw materials and their amounts used in the production of polymers in Examples 1, 2, and 13 to 16 and Comparative Example 1, as well as the evaluation results of the obtained polymers. Since the polymers of Examples 1, 2, and 13 to 16 had excellent stretchability, high rupture stress, and a high recovery rate, it was found that they had excellent self-healing properties. The results indicate that the macromolecular materials have the desired performance even when combining a (meth)acrylic ester compound and water-soluble (meth)acrylamide as the third polymerizable monomers.

The above results indicate that it is possible to freely design the stretchability, strength (rupture stress), and hardness of the macromolecular materials containing the polymers obtained in the Examples, by suitably designing the type and combination of third polymerizable monomers. Therefore, it was shown that the macromolecular materials of the present invention have a high degree of freedom in the design of stretchability, strength, and hardness.

TABLE 1

| | | | | Comparative Example | | | Example | | | | |
|---|---|---|---|---|---|---|---|---|---|---|---|
| | | | | 1 | 2 | 3 | 1 | 2 | 3 | 4 | 5 |
| Proportion of each polymerizable monomer (mol %) | Third polymerizable monomer | | | 98 | 98 | 98 | 98 | 98 | 98 | 98 | 98 |
| | Host | Ac-CDAA | | 1 | 1 | 1 | 1 | 1 | 1 | 1 | 1 |
| | Guest | ADAA | | 1 | 1 | 1 | 1 | 1 | 1 | 1 | 1 |
| Content ratio of each component (wt %) | Third polymerizable monomer | 2EHA | Water insoluble | 88.66 | — | — | — | — | — | — | — |
| | | OctA | Water insoluble | — | 88.65 | — | — | — | — | — | — |
| | | EA | Water insoluble | — | — | — | — | — | — | — | 81.17 |
| | | DMAA | Water soluble | — | — | 81.02 | — | — | — | — | — |
| | | 4HBA | Water soluble | — | — | — | 85.86 | — | — | — | — |
| | | 2MEA | Water insoluble | — | — | — | — | 84.80 | — | — | — |
| | | TUFA | Water insoluble | — | — | — | — | — | 87.00 | — | — |
| | | 2PhEA | Water insoluble | — | — | — | — | — | — | 89.09 | — |
| | Host | Ac-CDAA | | 10.00 | 10.00 | 16.93 | 12.60 | 13.50 | 11.50 | 9.60 | 16.79 |
| | Guest | ADAA | | 1.00 | 1.01 | 1.71 | 1.20 | 1.36 | 1.16 | 0.97 | 1.70 |
| | Polymerization initiator | Irgacure 184 | | 0.34 | 0.34 | 0.34 | 0.34 | 0.34 | 0.34 | 0.34 | 0.34 |
| | Total | | | 100 | 100 | 100 | 100 | 100 | 100 | 100 | 100 |
| Evaluation | Monomer solubility | | | X | X | ○ | ○ | ⊚ | ○ | ○ | ○ |
| | Odor | | | — | — | ○ | ○ | ○ | ○ | ○ | X |

TABLE 1-continued

|  |  | Comparative Example | | | Example | | | | |
| --- | --- | --- | --- | --- | --- | --- | --- | --- | --- |
|  |  | 1 | 2 | 3 | 1 | 2 | 3 | 4 | 5 |
|  | Rupture force (kPa) | — | — | 3482 | 1000 | 351 | 521 | 276 | 608 |
|  | Rupture force after 24-hour recontact (kPa) | — | — | 0 | 381 | 177 | 253 | 164 | 162 |
|  | Rupture force recovery rate (%) | — | — | 0 | 38 | 50 | 49 | 59 | 27 |
|  | Elongation (%) | — | — | 5.8 | 586 | 664 | 567 | 523 | 325 |
|  | Elongation after 24-hour recontact (%) | — | — | 0 | 312 | 143 | 230 | 306 | 18 |
|  | Elongation recovery rate (%) | — | — | 0 | 53 | 22 | 41 | 59 | 6 |
|  | Hardness (point) | — | — | 92 | 17 | 6 | 12 | 18 | 36 |

*In the table, "Host" refers to a host group-containing polymerizable monomer, and "Guest" refers to a guest group-containing polymerizable monomer.

TABLE 2

|  |  |  | Example | | | | |
| --- | --- | --- | --- | --- | --- | --- | --- |
|  |  |  | 6 | 7 | 8 | 1 | 9 |
| Proportion of each polymerizable monomer (mol %) | Third polymerizable monomer | 4HBA | 99.8 | 99.5 | 99.0 | 98.0 | 96.0 |
|  | Host | Ac-CDAA | 0.1 | 0.25 | 0.5 | 1.0 | 2.0 |
|  | Guest | ADAA | 0.1 | 0.25 | 0.5 | 1.0 | 2.0 |
| Content of each component (wt %) | Third polymerizable monomer | 4HBA | 98.20 | 95.89 | 92.40 | 85.86 | 75.32 |
|  | Host | Ac-CDAA | 1.32 | 3.42 | 6.60 | 12.60 | 22.10 |
|  | Guest | ADAA | 0.14 | 0.35 | 0.66 | 1.20 | 2.24 |
|  | Polymerization initiator | Irgacure 184 | 0.34 | 0.34 | 0.34 | 0.34 | 0.34 |
|  | Total |  | 100 | 100 | 100 | 100 | 100 |
| Evaluation | Monomer solubility |  | ○ | ○ | ○ | ○ | ○ |
|  | Odor |  | ○ | ○ | ○ | ○ | ○ |
|  | Rupture force (kPa) |  | 421 | 572 | 825 | 1000 | 2963 |
|  | Rupture force after 24-hour recontact (kPa) |  | 417 | 222 | 304 | 381 | 977 |
|  | Rupture force recovery rate (%) |  | 99 | 39 | 37 | 38 | 33 |
|  | Elongation (%) |  | 449 | 582 | 551 | 586 | 488 |
|  | Elongation after 24-hour recontact (%) |  | 449 | 323 | 343 | 312 | 159 |
|  | Elongation recovery rate (%) |  | 100 | 55 | 62 | 53 | 33 |
|  | Hardness (point) |  | 8 | 11 | 15 | 17 | 26 |

*In the table, "Host" refers to a host group-containing polymerizable monomer, and "Guest" refers to a guest group-containing polymerizable monomer.

TABLE 3

|  |  |  |  |  | Comparative Example | Example | | | |
| --- | --- | --- | --- | --- | --- | --- | --- | --- | --- |
|  |  |  |  |  | 1 | 10 | 11 | 12 | 1 |
| Proportion of each polymerizable monomer (mol %) | Third polymerizable monomer | 98 | Proportion of 2EHA in third polymerizable monomer (mol %) |  | 100 | 80 | 50 | 20 | 0 |
|  |  |  | Proportion of 4HBA in third polymerizable monomer (mol %) |  | 0 | 20 | 50 | 80 | 100 |
|  | Host | 1 | — |  | — | — | — | — | — |
|  | Guest | 1 | — |  | — | — | — | — | — |
| Content of each component (wt %) | Third polymerizable monomer | 2EHA | Water insoluble |  | 88.66 | 73.80 | 49.04 | 21.00 | — |
|  |  | 4HBA | Water soluble |  | — | 14.41 | 38.40 | 65.67 | 85.86 |
|  | Host | Ac-CDAA |  |  | 10.00 | 10.40 | 11.10 | 11.80 | 12.60 |
|  | Guest | ADAA |  |  | 1.00 | 1.05 | 1.12 | 1.19 | 1.20 |
|  | Polymerization initiator | Irgacure 184 |  |  | 0.34 | 0.34 | 0.34 | 0.34 | 0.34 |
|  | Total |  |  |  | 100 | 100 | 100 | 100 | 100 |
| Evaluation | Monomer solubility |  |  |  | X | ○ | ○ | ○ | ○ |
|  | Odor |  |  |  | — | ○ | ○ | ○ | ○ |
|  | Rupture force (kPa) |  |  |  | — | 683 | 385 | 583 | 1000 |
|  | Rupture force after 24-hour recontact (kPa) |  |  |  | — | 76 | 153 | 224 | 381 |
|  | Rupture force recovery rate (%) |  |  |  | — | 11 | 40 | 38 | 38 |
|  | Elongation (%) |  |  |  | — | 1562 | 729 | 600 | 586 |
|  | Elongation after 24-hour recontact (%) |  |  |  | — | 390 | 374 | 326 | 312 |
|  | Elongation recovery rate (%) |  |  |  | — | 25 | 51 | 54 | 53 |
|  | Hardness (point) |  |  |  | — | <5 | <5 | 8 | 17 |

*In the table, "Host" refers to a host group-containing polymerizable monomer, and "Guest" refers to a guest group-containing polymerizable monomer.

TABLE 4

|  |  |  |  | Comparative Example | Example | | | | | |
|---|---|---|---|---|---|---|---|---|---|---|
|  |  |  |  | 1 | 1 | 2 | 13 | 14 | 15 | 16 |
| Proportion of each polymerizable monomer (mol %) | Third polymerizable monomer | 98 | Proportion of DMAA in third polymerizable monomer (mol %) | 100 | 0 | 0 | 20 | 10 | 50 | 30 |
|  |  |  | Proportion of 4HBA in third polymerizable monomer (mol %) | 0 | 100 | 0 | 80 | 90 | 0 | 0 |
|  |  |  | Proportion of 2MEA in third polymerizable monomer (mol %) | 0 | 0 | 100 | 0 | 0 | 50 | 70 |
|  | Host | 1 | — | — | — | — | — | — | — | — |
|  | Guest | 1 | — | — | — | — | — | — | — | — |
| Content of each component (wt %) | Third polymerizable monomer | DMAA | Water soluble | 81.02 | — | — | 12.50 | 6.08 | 36.00 | 20.60 |
|  |  | 4HBA | Water soluble | — | 85.86 | — | 72.74 | 79.60 | — | — |
|  |  | 2MEA | Water insoluble | — | — | 84.80 | — | — | 47.14 | 63.21 |
|  | Host | Ac-CDAA |  | 16.93 | 12.60 | 13.50 | 13.10 | 12.70 | 15.00 | 14.40 |
|  | Guest | ADAA |  | 1.71 | 1.20 | 1.36 | 1.32 | 1.28 | 1.52 | 1.45 |
|  | Polymerization | Irgacure 184 |  | 0.34 | 0.34 | 0.34 | 0.34 | 0.34 | 0.34 | 0.34 |
| Evaluation | Total |  |  | 100 | 100 | 100 | 100 | 100 | 100 | 100 |
|  | Monomer solubility |  |  | ○ | ○ | ◉ | ○ | ○ | ◉ | ◉ |
|  | Odor |  |  | ○ | ○ | ○ | ○ | ○ | ○ | ○ |
|  | Rupture force (kPa) |  |  | 3482 | 1000 | 351 | 3142 | 1173 | 11243 | 935 |
|  | Rupture force after 24-hour recontact (kPa) |  |  | 0 | 381 | 177 | 1042 | 424 | 2135 | 486 |
|  | Rupture force recovery rate (%) |  |  | 0 | 38 | 50 | 33 | 36 | 19 | 52 |
|  | Elongation (%) |  |  | 5.8 | 586 | 664 | 571 | 667 | 7 | 752 |
|  | Elongation after 24-hour recontact (%) |  |  | 0 | 312 | 143 | 436 | 250 | 4 | 420 |
|  | Elongation recovery rate (%) |  |  | 0 | 53 | 22 | 76 | 37 | 57 | 56 |
|  | Hardness (point) |  |  | 92 | 17 | 6 | 22 | 20 | 61 | 25 |

*In the table, "Host" refers to a host group-containing polymerizable monomer, and "Guest" refers to a guest group-containing polymerizable monomer.

The invention claimed is:

1. A macromolecular material comprising a polymer having a host group and a guest group, wherein
    the host group is a monovalent group formed by removing one hydrogen atom or hydroxy group from a cyclodextrin derivative,
    the cyclodextrin derivative has a structure formed such that a hydrogen atom of at least one hydroxy group contained in a cyclodextrin is replaced with at least one group selected from the group consisting of a hydrocarbon group, an acyl group, and -CONHR wherein R represents a methyl group or an ethyl group,
    the polymer is a polymer of a monomer mixture containing a host group-containing polymerizable monomer, a guest group-containing polymerizable monomer, and a third polymerizable monomer,
    the third polymerizable monomer contains a (meth)acrylic ester compound,
    the host group-containing polymerizable monomer and the guest group-containing polymerizable monomer have a property of being dissolved in the third polymerizable monomer,
    the mixture of the host group-containing polymerizable monomer and the guest group-containing polymerizable monomer in a total amount of 1 part by weight or more is dissolved per 100 parts by weight of the third polymerizable monomer at a temperature of 20° C., and
    the third polymerizable monomer comprises at least one selected from the group consisting of 2-methoxyethyl acrylate, tetrahydrofurfuryl acrylate, 2-phenylethyl acrylate and 4-hydroxybutyl acrylate.

2. The macromolecular material according to claim 1, wherein in the monomer mixture, the host group-containing polymerizable monomer and the guest group-containing polymerizable monomer are each contained in an amount of 0.01 to 10 mol % based on the total amount of the host group-containing polymerizable monomer, the guest group-containing polymerizable monomer, and the third polymerizable monomer.

3. A method for producing the macromolecular material according to claim 2, comprising:
    dissolving a host group-containing polymerizable monomer and a guest group-containing polymerizable monomer in a third polymerizable monomer to prepare a monomer mixture; and
    polymerizing the monomer mixture to obtain a polymer.

4. A method for producing the macromolecular material according to claim 1, comprising:
    dissolving a host group-containing polymerizable monomer and a guest group-containing polymerizable monomer in a third polymerizable monomer to prepare a monomer mixture; and
    polymerizing the monomer mixture to obtain a polymer.

5. The macromolecular material according to claim 1, wherein the mixture of the host group-containing polymerizable monomer and the guest group-containing polymerizable monomer in a total amount of 10 part by weight or more is dissolved per 100 parts by weight of the third polymerizable monomer at a temperature of 20° C.

6. The macromolecular material according to claim 1, wherein the third polymerizable monomer is at least one selected from the group consisting of 2-methoxyethyl acrylate, tetrahydrofurfuryl acrylate and 2-phenylethyl acrylate.

* * * * *